US006816065B2

(12) United States Patent
Viero

(10) Patent No.: US 6,816,065 B2
(45) Date of Patent: Nov. 9, 2004

(54) ELECTROMECHANICAL HORN WARNING SYSTEM

(75) Inventor: Bruno Viero, Vicenza (IT)

(73) Assignee: Fabbrica Italiana Accumulatori Motocarri, Vicenza (IT)

( * ) Notice: Subject to any disclaimer, the term of this patent is extended or adjusted under 35 U.S.C. 154(b) by 145 days.

(21) Appl. No.: 10/296,281

(22) PCT Filed: Jul. 17, 2001

(86) PCT No.: PCT/EP01/08212

§ 371 (c)(1),
(2), (4) Date: Nov. 22, 2002

(87) PCT Pub. No.: WO02/09974

PCT Pub. Date: Feb. 7, 2002

(65) Prior Publication Data

US 2003/0146824 A1 Aug. 7, 2003

(30) Foreign Application Priority Data

Aug. 1, 2000 (IT) ..................................... MI2000A1780

(51) Int. Cl.[7] ............................................... G08B 3/00
(52) U.S. Cl. ............................. 340/384.1; 340/388.1; 381/396; 116/59; 116/142 R; 116/142 FP; 181/144
(58) Field of Search ...................... 340/388.1; 381/396; 116/59, 142 R, 142 FP; 181/144

(56) References Cited

U.S. PATENT DOCUMENTS

| | | | | |
|---|---|---|---|---|
| 4,097,861 A | * | 6/1978 | Pariza ...................... 340/388.8 |
| 4,785,280 A | | 11/1988 | Fubini et al. ............. 340/52 F |
| 5,166,665 A | * | 11/1992 | McCarthy ................. 340/546 |
| 5,754,095 A | | 5/1998 | Bader et al. ............. 340/384.7 |
| 6,487,300 B1 | * | 11/2002 | Lee et al. .................... 381/396 |
| 6,489,885 B2 | | 12/2002 | Solow ..................... 340/384.3 |

FOREIGN PATENT DOCUMENTS

| | | |
|---|---|---|
| DE | 2117321 | 10/1972 |
| DE | 81 36 680.9 | 4/1982 |
| DE | 38 12 144 A1 | 10/1989 |
| DE | 195 29 738 A1 | 2/1997 |
| DE | 197 26 271 C2 | 12/1998 |
| EP | 0 472 971 A2 | 3/1992 |
| EP | 0 657 869 A1 | 6/1995 |
| EP | 0 919 437 A1 | 6/1999 |
| EP | 1 028 029 A2 | 8/2000 |
| FR | 1 300 695 | 6/1962 |
| FR | 2 687 623 A1 | 8/1993 |
| FR | 2 791 620 A1 | 10/2000 |
| GB | 523482 | 7/1940 |
| GB | 1029780 | 5/1966 |
| KR | 9208716 | 10/1992 |
| WO | WO 94/26550 | 11/1994 |
| WO | WO 94/26555 | 11/1994 |
| WO | WO 02/07992 A1 | 1/2002 |

* cited by examiner

Primary Examiner—Daniel J. Wu
Assistant Examiner—Samuel J. Walk
(74) Attorney, Agent, or Firm—Gifford, Krass, Groh, Sprinkle, Anderson & Citkowski, P.C.

(57) ABSTRACT

An electromechanical horn warning system comprising a hollow body (2) having a cylindrical wall (8) closed by a bottom wall (9) and a flanged edge (12). At least one bobbin (3) abuts on the bottom wall (9) of the hollow body. An elastic membrane (6) is provided with at least one mobile core (7) that is fixed to the flanged edge (12) of the hollow body. At least one contact breaker (4) having a support (22) and a spring (23) are provided with electric contacts (27, 28). An insulating plate (5) is sandwiched between the support (22) and the spring (23), and is provided with at least one layer (31, 32) of resistive silk-screen ink.

7 Claims, 1 Drawing Sheet

ELECTROMECHANICAL HORN WARNING SYSTEM

FIELD OF THE INVENTION

The present invention relates to an electromechanical horn warning system.

More particularly, the present invention relates to an electromechanical horn warning system especially suitable to be applied on motor-vehicles.

BACKGROUND OF THE INVENTION

Electromechanical horn warning systems are known that comprise a hollow body open at an end, an electric bobbin housed within the hollow body, and a membrane having a movable core fixed at the edge of the open end of the hollow body.

The electric bobbin is fixed to the wall of the closed end of the hollow body and is in communication with a contact breaker. The contact breaker includes a support, a spring provided with electric contacts and an insulating plate sandwiched between the support and the spring. As is known, the electromechanical horn warning systems of this type produce undesired electromagnetic transients during operation.

To prevent this drawback, a resistor of adequate value is connected parallel to the contact breaker by fixing one end to the support and the other end to the spring of the contact breaker. The resistor operates to attenuate electromagnetic transients by causing a drastic drop of the overvoltages produced by the opening and closing of the electric contacts.

Although the resistor provides adequate transient suppression, its introduction imposes drawbacks of both a constructive and a functional character.

A first drawback is that the resistor constitutes a constructive complication in that it requires electrical connections and special supports which increases the manufacturing cost of the horn warning system.

A second drawback is that the resistor can be damaged and/or the electrical connections may break due to vibration and/or temperature changes that derive from running the vehicle and/or operating the horn warning system. This leads to system malfunction.

The object of the present invention is to obviate the above drawbacks. More particularly, object of the present invention is to provide an electromechanical horn warning system that includes electromagnetic transient suppression and obviates the drawbacks of a constructive and functional character referred to hereinabove.

SUMMARY OF THE INVENTION

The present invention provides an electromechanical horn warning system that includes a hollow body having a wall of a first cylindrical part closed by a bottom wall, a second flat part, a third cylindrical part and a flanged edge. At least one bobbin abuts on the bottom wall of the first cylindrical part. An elastic membrane, provided with at least one movable core is fixed to the flanged edge of the hollow body.

At least one contact breaker is provided having a support, a spring provided with electric contacts, and an insulating plate sandwiched between the support and the spring. The insulating plate is provided with at least one layer of resistive silk-screen ink that has a global resistance suitable to eliminate electromagnetic transients.

The at least one layer of resistive silk-screen ink may be coated on one, and preferably both, of the surfaces of the insulating plate.

BRIEF DESCRIPTION OF THE DRAWING

The constructive and functional characteristics of the electromechanical horn warning system of the present invention will be better understood in view of the following detailed description wherein reference is made to the attached drawings that illustrate an embodiment reported only by way of non limiting example, and wherein.

DETAILED DESCRIPTION OF THE PREFERRED EMBODIMENTS

Figure 1:
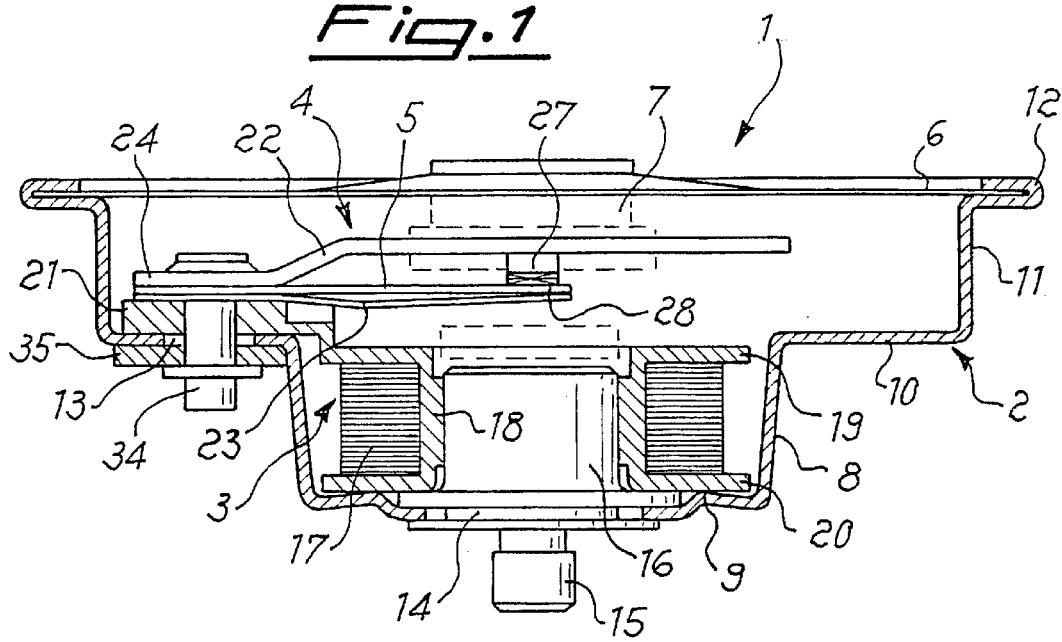
FIG. 1 shows the schematic view of a section of the electromechanical horn warning system of the present invention.

With reference to the attached figures, the electromechanical horn warning system 1 of the present invention comprises a hollow body 2, an electric bobbin 3, and a contact breaker 4. The contact breaker 4 further includes an insulating plate 5, and an elastic membrane 6 provided with a movable core 7.

The hollow body 2 is defined by a wall having a first cylindrical part 8 closed by a bottom wall 9, a second flat part 10 forming a shoulder, a third cylindrical part 11 and a lower flanged edge 12. The second flat part 10 is provided with a through-hole 13.

A supporting element 14 is associated with the bottom wall 9. The supporting element 14 is provided with a threaded pin 15 for the fastening to the vehicle and a cylindrical protrusion 16 suitable to constitute the fixed core of bobbin 3. The threaded pin 15 and the cylindrical protrusion 16 are located, respectively, on an external part and an internal part of the hollow body 2.

The bobbin 3 has a coil 17 wound on a reel 18. Reel 18 comprises a central hole and protruding flanges 19, 20. The diameter of the central hole is equal to the external diameter of protrusion 16. The external diameter of flanges 19 and 20 is substantially equal to the internal diameter of the first cylindrical part 8 of the hollow body 2. The height of reel 18 is substantially equal to the first cylindrical part 8.

An extension 21 is radially associated with the flange 19 and forms an integral part thereof. The extension 21 is suitable to fix reel 18, and therefore bobbin 3, to the hollow body 2 on the shoulder constituted by the flat part 10.

The contact breaker 4 comprises a support 22, a spring 23 and the insulating plate 5. Support 22 has a fastening zone 24 facing the flat part 10 of the hollow body 2, and is provided with a first electric contact 27, preferably made from tungsten. Spring 23 is constituted by a laminar element facing support 22 starting from zone 24 until it covers the first electric contact 27. At the end corresponding to the electric contact 27, the spring 23 is provided with a second electric contact 28, preferably from tungsten, mutually facing the first electric contact 27.

Figure 2:
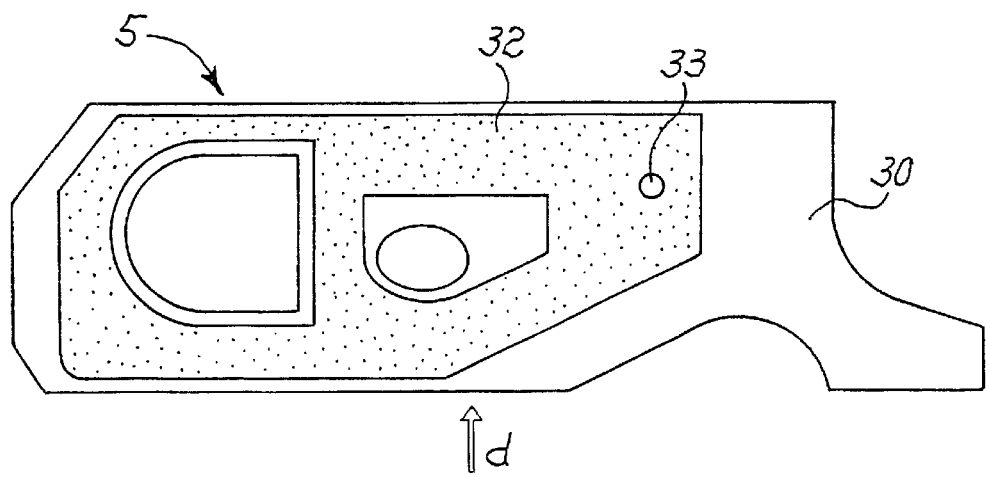
FIG. 2 shows the schematic front view of the insulating plate of the horn warning system of FIG. 1.
Figure 3:
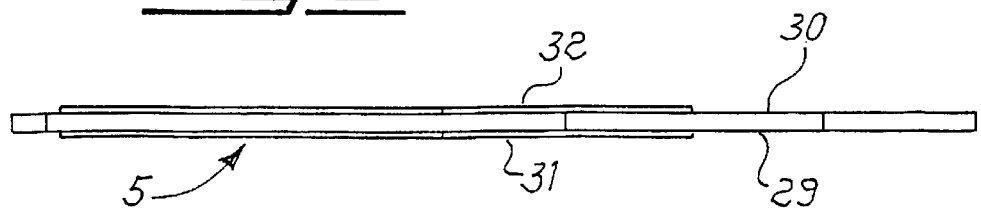
FIG. 3 shows the schematic lateral view of the plate of FIG. 2, according to the "d" direction of FIG. 2.

The insulating plate 5 is sandwiched between support 22 and spring 23 and extends in the same direction as spring 23, starting from zone 24 of support 22 until it covers said electric contacts 27 and 28. The insulating plate 5 has at least one layer 31 and 32 of resistive silk-screen ink, preferably coated with a polymeric (PTE) film, on each of its opposing surfaces 29 and 30 (see FIG. 3). As best illustrated in FIG. 2, a hole 33 provides continuity between the opposite layers 31 and 32 via the resistive silk-screen ink or through suitable conductive means. The layers 31 and 32 of resistive silk-screen ink are such as to provide a global electric resistance sufficient to eliminate the undesired electromagnetic transients caused by the opening and closing of the electric contacts. Preferably, the insulating plate 5 is constituted by bakelite cloth, and the resistive silk-screen ink is selected from a range of 10 and 40 Ω, most preferably from a range of 22 and 28 Ω. Further the global resistance is preferably selected from among the values 50 and 130 Ω and most preferably from among the values 70 and 110 Ω.

For the assembly of the contact breaker 4 of the electromechanical horn warning system of the present invention, a rivet 34 is caused to pass through a base 35 made from plastic material, the through-hole 13 of the flat part 10 of the hollow body 2, the extension 21 of reel 18, the spring 23, the insulating plate 5 and the fastening zone 24 of support 22. Rivet 34 is then riveted and fixes bobbin 3 and the contact breaker 4 to the hollow body 2. In this fashion, layers 31 and 32 of resistive silk-screen ink are electrically connected to the electric contacts 27 and 28 through spring 23 and support 22 respectively, such that they provide the electrical resistance necessary to eliminate undesired electromagnetic transients.

Finally, membrane 6 being provided with a movable core 7 is then fixed by means of a clinching to the flange-shaped edge 12 of the hollow body 2 to complete the assembly.

In resting conditions, the movable core 7 goes away from bobbin 3. The action of spring 23 causes the electric contact 28 to abut against the electric contact 27 so that the electric circuit of the horn warning system is closed and ready to be controlled.

During activation of the electromechanical horn warning system of the present invention, the electric circuit is complete and therefore bobbin 3 draws the movable core 7, associated to membrane 6, toward the fixed core 16. During this movement, the movable core 7 acts on the insulating plate 5 which, in turn, acts on spring 23 opening the electric contacts 27 and 28 to cause the interruption of the electric circuit. The overvoltage generated at the electric contacts 27 and 28, which may lead to the formation of an electric arc, is absorbed by the resistance of layers 31 and 32 of resistive silk-screen ink. With the interruption of the electric circuit, bobbin 3 releases the mobile core 7, and therefore membrane 6 which goes back to its starting position, allowing spring 23 to bring the electric contact 28 back into abutment with the electric contact 27 so that a new cycle can start.

It is now obvious that the insulating plate 5 provided with layers 31 and 32 of resistive silk-screen ink can provide the electric resistance necessary to eliminate the unpleasant electromagnetic transients. It is further obvious that the drawbacks arising from the application of the electric resistance of the prior art are overcome and eliminated.

The electromechanical horn warning system according to the present invention has allowed the drastic drop of the undesired electromagnetic transients, attributable to an unusual constructive simplicity that results in the elimination of the electric resistance as an autonomous element and the elimination of the related supports.

While the present invention has been described in conjunction with a specific embodiment, it is obvious that many alternatives and variations may become apparent to those skilled in the art in the light of the foregoing description.

Accordingly, the invention is intended to embrace all of the alternatives and variations that fall within the spirit and scope of the invention.

What is claimed is:

1. An electromechanical horn warning system comprising:
   a hollow body having a cylindrical wall extending from a bottom wall;
   at least one electric bobbin abutting said bottom wall;
   an elastic membrane, provided with at least one movable core, mounted to said hollow body; and
   at least one contact breaker having:
   a support provided with a first electric contact;
   a spring provided with a second electric contact; and
   an insulating plate sandwiched between said support and said spring, wherein said insulating plate is provided with at least a layer of resistive silk-screen ink.

2. The electromechanical horn warning system according to claim 1, wherein the at least one layer of silk-screen ink has a global resistance suitable to eliminate electromagnetic transients.

3. The electromechanical horn warning system according to claim 1, wherein the at least one layer of silk-screen ink is coated on both surfaces of the insulating plate.

4. The electromechanical horn warning system according to claim 3, wherein the layers coated on both surfaces of the insulating plate are connected to each other through a through-hole.

5. The electromechanical horn warning system according to claim 1, wherein said insulating plate is made from bakelite cloth.

6. The electromechanical horn warning system according to claim 1, wherein the at least one layer of resistive silk-screen ink has a resistance in the range of 10 and 40 Ω, and the global resistance is in the range of 50 and 130 Ω.

7. The electromechanical horn warning system according to claim 6, wherein said at least one layer of resistive silk-screen ink is selected from among the values of 22 and 28 Ω and has a global resistance of between 70 and 110 Ω.

* * * * *

UNITED STATES PATENT AND TRADEMARK OFFICE
CERTIFICATE OF CORRECTION

PATENT NO. : 6,816,065 B2 Page 1 of 1
APPLICATION NO. : 10/296281
DATED : November 9, 2004
INVENTOR(S) : Bruno Viero It is certified that error appears in the above-identified patent and that said Letters Patent is hereby corrected as shown below:

Column 3, line 11, replace "from among 10 and 40 $\Omega$," with -- from among 10 and 40 $\Omega^2$, --
Column 3, line 12, replace "of 22 and 28 $\Omega$." with -- of 22 and 28 $\Omega^2$. --

Signed and Sealed this

Sixteenth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 6,816,065 B2
APPLICATION NO. : 10/296281
DATED : November 9, 2004
INVENTOR(S) : Bruno Viero It is certified that error appears in the above-identified patent and that said Letters Patent is hereby corrected as shown below:

On the Title page item (73), replace "Fabbrica Italiana Accumulatori Motocarri" with --Fabbrica Italiana Accumulatori Motocarri Montecchio F.I.A.M.M. S.P.A.--

Signed and Sealed this

Fifth Day of August, 2008

JON W. DUDAS
*Director of the United States Patent and Trademark Office*